United States Patent [19]

Riise et al.

[11] 4,432,343
[45] Feb. 21, 1984

[54] SOLAR ENERGY COLLECTOR SYSTEM

[75] Inventors: H. Norman Riise; George G. Goranson, both of La Canada; Henry P. Karwan, Fountain Valley, all of Calif.

[73] Assignee: Viking Solar Systems, Incorporated, Glendale, Calif.

[21] Appl. No.: 369,673

[22] Filed: Jan. 21, 1982

Related U.S. Application Data

[63] Continuation of Ser. No. 126,243, Mar. 3, 1980, abandoned.

[51] Int. Cl.³ ................................................. F24J 3/02
[52] U.S. Cl. ..................................... 126/424; 126/438; 126/443; 364/460; 364/516
[58] Field of Search ............... 126/438, 424, 425, 417, 126/443, 439; 350/293, 310, 296; 250/203 R; 33/268; 364/900, 460, 516; 318/582, 575; 353/3

[56] References Cited

U.S. PATENT DOCUMENTS

| | | | |
|---|---|---|---|
| 1,162,505 | 11/1915 | Nichols | 126/425 |
| 1,946,184 | 2/1934 | Abbot | 126/443 X |
| 3,049,055 | 8/1962 | Tubbs | 126/438 X |
| 3,070,643 | 12/1962 | Toulmin, Jr. | 126/425 X |
| 3,861,379 | 1/1975 | Anderson, Jr. | 126/425 |
| 4,038,972 | 8/1977 | Orrison | 126/425 |
| 4,114,594 | 9/1978 | Meyer | 126/424 |
| 4,135,493 | 1/1979 | Kennedy | 126/425 |
| 4,172,443 | 10/1979 | Sommer | 126/438 X |
| 4,215,410 | 7/1980 | Weslow et al. | 364/516 |
| 4,253,895 | 3/1981 | Chenault | 126/438 X |

OTHER PUBLICATIONS

Carden; Steering a Field of Mirrors Using a Shared Computer Based Controller, Solar Energy, vol. 20, pp. 345–355, 1978.

*Primary Examiner*—Larry Jones
*Attorney, Agent, or Firm*—Harry R. Lubcke

[57] ABSTRACT

A trough-like concentrator having a reflective surface contoured to image the sun at a linear focus. The reflective surface is supported by a structural tube having plural ribs.

A microcomputer is programmed to exclusively aim the concentrator at the sun.

A stationary vacuum-insulated linear solar energy receiver is positioned at the focus of the concentrator, with heat-transfer fluid entering at one end of the receiver and leaving at the other end.

18 Claims, 10 Drawing Figures

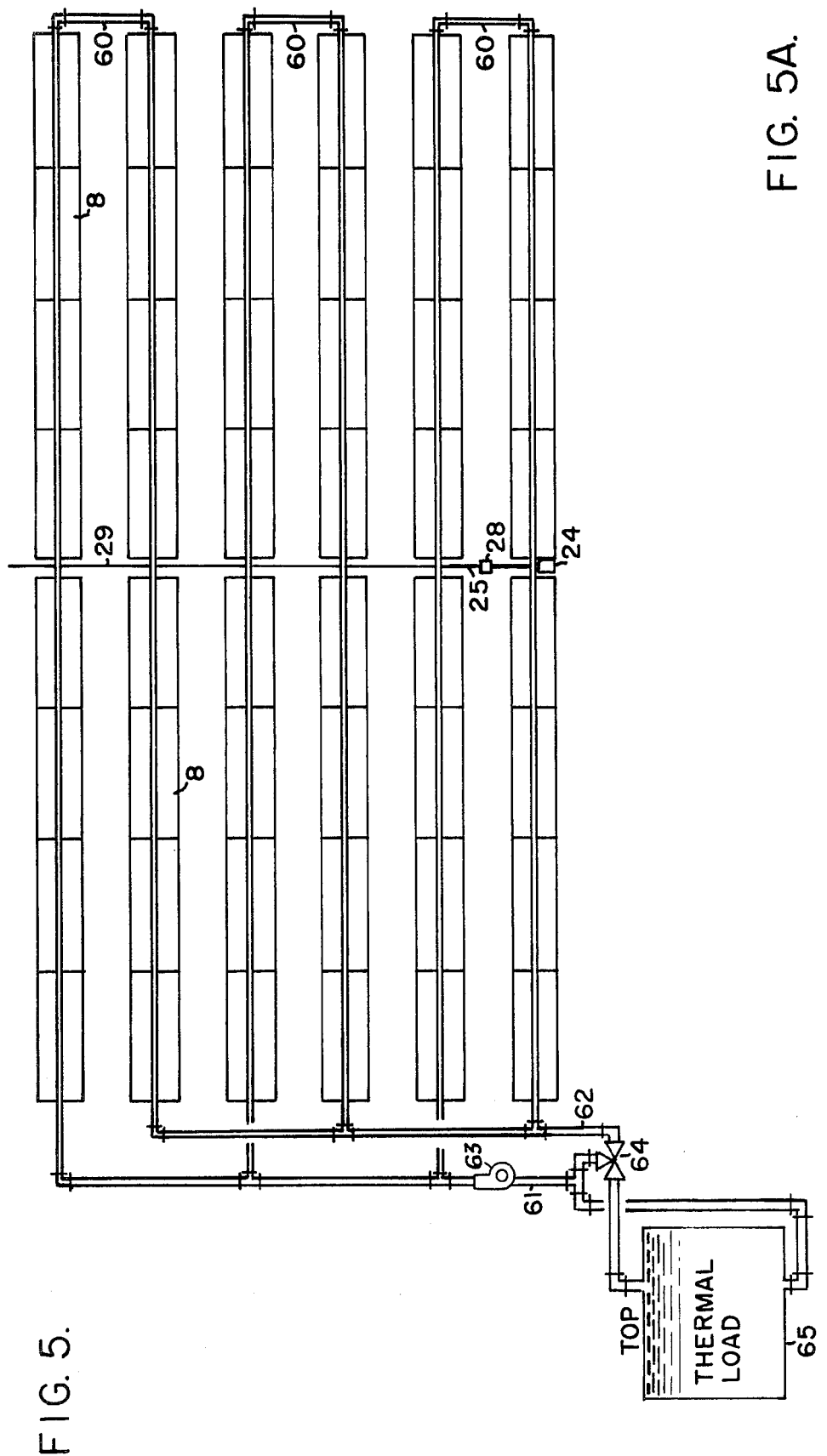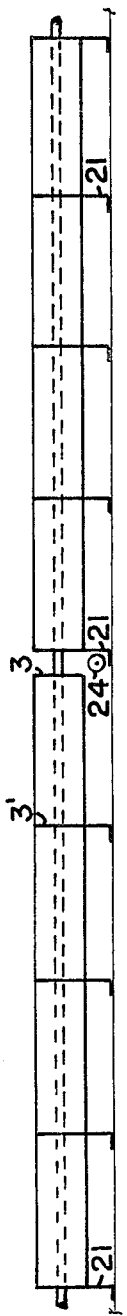
FIG. 5.
FIG. 5A.

SOLAR ENERGY COLLECTOR SYSTEM

BACKGROUND OF THE INVENTION

This is a continuation of application Ser. No. 126,243, filed Mar. 3, 1980, now abandoned.

This invention pertains to the collection of solar energy to thermally raise the temperature of a working substance.

Gupta, U.S. Pat. No. 4,154,219, discloses a multi-prismatic elongated parabolic reflector with an at-focus central heat absorber. A digital computer calculates the position of the sun, but this is only fed-in as a reflector drive input along with the "actual position of the sun", which position is determined by a pair of photodiodes that meaningfully observe the sun. The details of the computer are omitted; it is only mentioned and not shown.

Carden, U.S. Pat. No. 4,158,354, discloses a pair of circular parabolic reflectors, a block diagram (FIG. 5), and a program (FIG. 8) for effecting positional control of the reflectors. Control involves the formulation of pulse trains having intervals between the pulses according to the status of the control parameter. A pair of photovoltaic cells provide information on the orientation of the reflectors with respect to the sun.

Moore, U.S. Pat. No. 4,137,879, discloses a large planar array of individually planar, parabolic or Fresnel collectors. These each have an equatorial mounting and are disposed as a group on the side of a building that is inclined 55° from the horizontal. A diagram having only one block intimates the presence of a computer, but nothing more.

Moan, U.S. Pat. No. 4,016,860, discloses a system utilizing air as the working substance in what amounts to a plurality of elongated Thermos bottles that are supported at the open end by an interconnecting manifold. The annular volume between an inner and an outer glass tubular wall is evacuated according to known practice. The working substance must enter at one side of the open throat and must leave at the other side of the same throat.

SUMMARY OF THE INVENTION

The present invention employs trough-like reflective concentrators, having a correspondingly contoured support beneath the same, and linear thermal energy receivers at the linear focus of the concentrators. Mechanical means maintain the concentrators pointed at the sun, under the exclusive control of a microcomputer that is programmed to function on the pure geometricl sun-earth relationship. Sun sensors are not employed.

The thermal efficiency of the system is monitored and may provide information as to the accuracy of tracking and the effects of other factors, such as variation in the weather and degredation of the components.

The linear thermal receivers may be provided with outer surrounding transparent tubes that are joined thereto by bellows to allow for differential expansion. The volume between is maintained at a vacuum by permanent hermetic sealing.

Each reflector is bonded to plural ribs that are, in turn, rigidly attached to the contoured support. This provides rigidity for accurate positioning. The bonding material has sufficient thickness and resilience to prevent significant distortion of the optical surface by differences in thermal expansion of the reflector and the support structure.

BRIEF DESCRIPTION OF THE DRAWINGS

FIG. 5 is a plan view showing the relation of the drive system for a number of concentrators and the plumbing system for the same.

FIG. 5A is an elevation view of the same.

DESCRIPTION OF THE PREFERRED EMBODIMENTS

Figure 1:
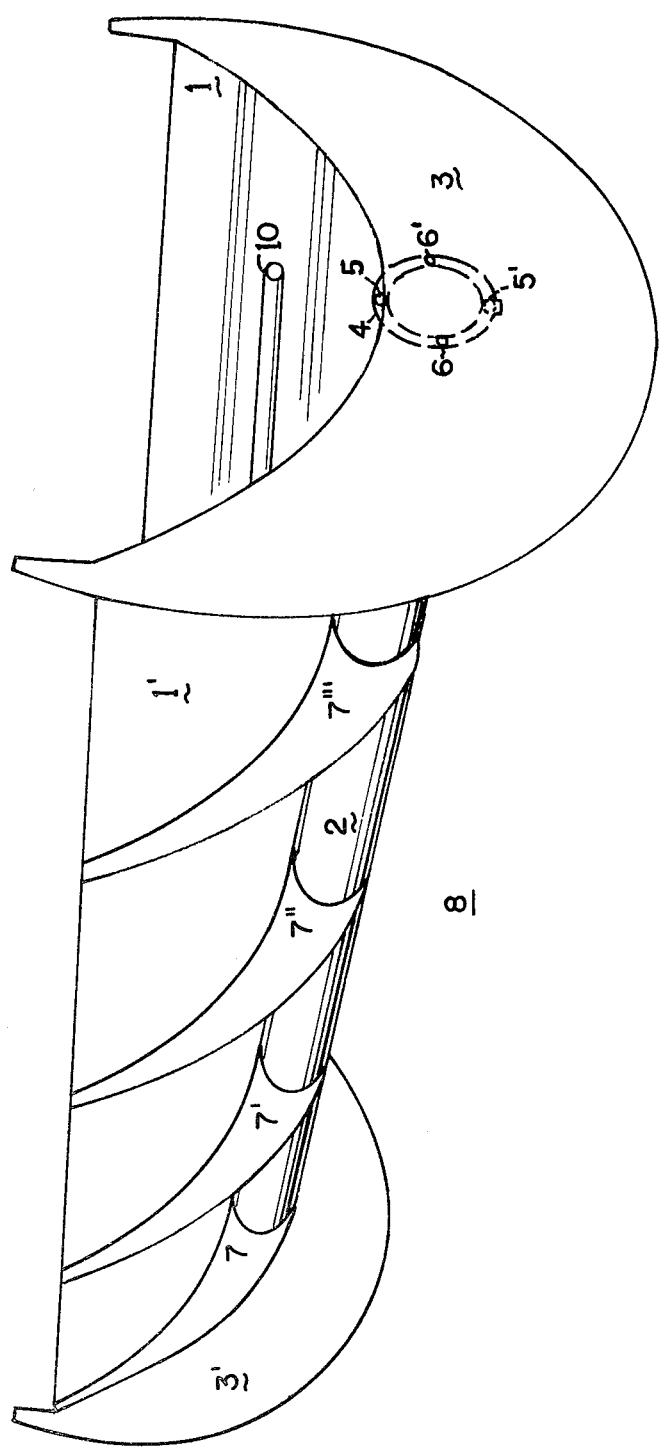
FIG. 1 is a perspective elevation view of one section of the concentrator structure.

In FIG. 1, numeral 8 generally identifies a trough-like concentrator, having a linear focus. It has a reflector 1, which may be of glass or other transparent material.

On underside 1', typically the known silver mirror reflective surface is applied so that the concave side of the reflector (upwards in the figure) is the effective mirror surface. A known protective backing, such as an epoxy-type coating, is applied to protect the silver from abrasion and from the atmosphere.

The cross-sectional shape of the reflective concentrator is seen at the right end of the structure. It is ordinarily not a true parabolic curve. It is quasi-parabolic. This takes into consideration the refraction of the light rays in passing through the glass to and from the silver mirror surface.

The profile can be described by a cubic or higher order equation. It becomes parabolic when the thickness of the glass becomes zero.

The equation is:

$$Y = AX^3 + BX^2 + CX + D$$

X and Y are in centimeters, and the values for the constants for a 90 cm wide aperture by 0.3 cm thickness of glass are:

$$A = 170.6553 \times 10^{-9}$$

$$B = 17.12772 \times 10^{-3}$$

$$C = -60.99 \times 10^{-5}$$

$$D = -73.914 \times 10^{-3}$$

Concentrator structures may be built in any length and width; however, one size is 2.5 meters (m) long, 90 cm wide and 30 cm deep.

Elongated tubular support 2 is the main structural member of the concentrator assembly. It is typically a 2.5 m length of thin wall steel tubing, approximately 15 cm in diameter with a 1.5 millimeter (mm) thick wall for a 0.9 m × 2.5 m aperture collector.

Each end of the tubular support is bolted (bolts 5 and 5') to a sector 3 and 3' by a flange 4. This flange is concentric with and is welded to tubular support 2 and serves for connecting one concentrator 8 assembly to another in an end-to-end array. Dowels 6 and 6' fit into reamed holes in each flange to provide accurate mechanical alignment between flanges.

Each concentrator assembly preferably includes ribs 7, 7', 7", 7"', etc. These ribs are formed of sheet steel stampings, with flanges at the edges for rigidity. The material is approximately one millimeter thick. Typically, one rib is welded to tubular support 2 at each end thereof and others are welded equally spaced therebetween.

A lightweight structure is thus provided, weighing 6.5 kilograms per square meter of aperture. Notwithstanding, the inherent rigidity of the tubular support is great and angular deformation (also known as "windup") is negligible when several assemblies are fastened together, end-to-end.

Figure 2:
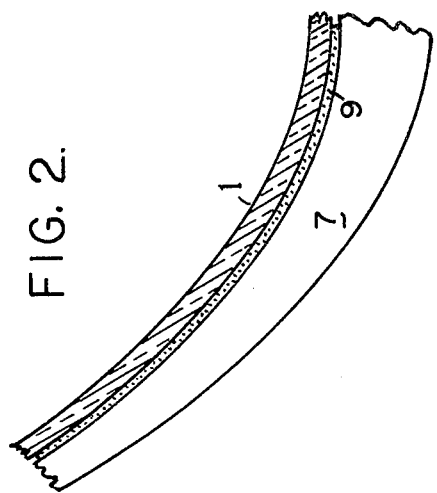
FIG. 2 is an enlarged detail of a portion of the rib-reflector assembly of the same.

In FIG. 2 a portion of a rib 7 is shown, looking axially along the concentrator structure as a whole. A portion of reflector 1 is also shown, and this is in section.

Between the two is a layer of adhesive 9. This adhesive expedites accurate, economical assembly and, while securely fastening elements 1 and 7 together, remains somewhat soft, thereby to accommodate displacement between the support and the reflector, to minimize distortion of the optical elements.

A silicone type adhesive may be used, such as room temperature vulcanizing rubber (General Electric Co., Silglaze SCS 2401).

The adhesive is applied into the space between elements 1 and 7 while these elements are held in the proper relative position by an assembly fixture that grasps the elements. The adhesive may be applied to element 7 before element 1 is put into place, or it may be applied by injection into the gap between elements 1 and 7 after element 1 has been put in place.

Energy-receiver 10 is positioned at the focus of reflective concentrator 1. It is held there by a support bracket 21 between adjcent concentrator assemblies, (See FIG. 5A.) and at each end of a row of such assemblies. The energy-receiver is "hard plumbed"; that is, it does not rotate nor move in any fashion.

The support bracket arrangement fixes the energy-receiver at one end and allows for thermal expansion of the same relative to the fixed end. Support brackets 21 are completely independent of the collector assembly, thus facilitating rotation of the collector assemblies by the drive system. Installation and maintenance of the collector assemblies is thereby simplified.

The energy-receiver preferably has a selective coating; i.e., high absorptivity and low emissivity. Such a coating is black chromium. At 300° Centigrade it has an absorptivity of 0.96 and an emissivity of only 0.15.

Figure 3:
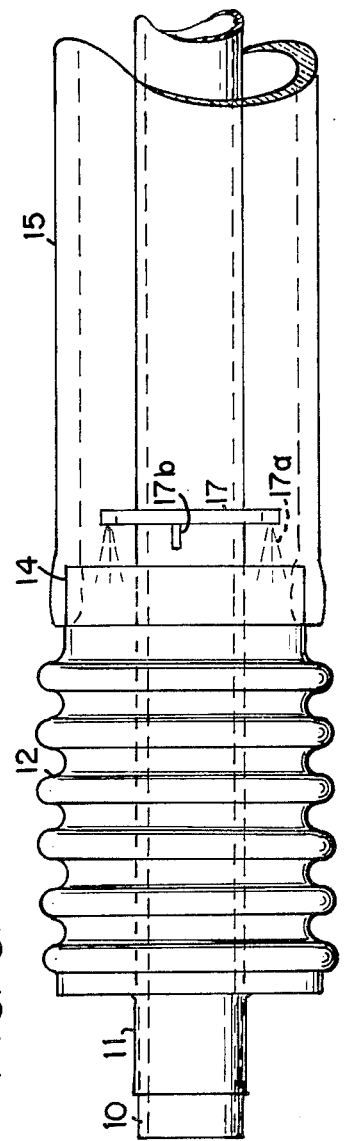
FIG. 3 is a side elevation detail of one end of an energy receiver, with a transparent surrounding tube and hermetic seal bellows.

In FIG. 3, energy-receiver 10 extends from the left side to the fragmentary termination at the right side. Surrounding the receiver is collar 11 of metal bellows 12. The bellows is vacuum-tight and a vacuum-tight joint is made to receiver 10 by welding.

A second collar 14 is hermetically sealed to transparent tube 15. This may be a Pyrex-type glass to stainless steel bellows seal in view of the nominal working temperature range involving a maximum temperature of about 300° C. This construction reduces the cost of manufacture, as compared to a graded glass seal or one involving the use of Kovar metal.

Elements 10 and 15 both extend far to the right in FIG. 3, for a distance of 2.5 m or more, and terminate in a second bellows assembly at the right. Bellows 12 thus accommodate the differential expansion with heat and the vacuum originally created between the two is maintained.

It will be understood that the vacuum surrounding energy-receiver 10 reduces all significant heat losses therefrom to only radiation. The vacuum is typically $10^{-3}$ mm of mercury, or better.

The annual thermal efficiency is thereby increased by about 20%, depending upon the weather and the operating temperature required of the energy-receiver as a part of the system that uses the solar thermal energy.

The operational advantage of having sealed-off vacuum surrounded energy-receiver tubing elements over any continuously pumped vacuum embodiment is apparent. The sealed-off construction can only be reliably accomplished by thermally baking the elements 10, 12 and 15 during evacuation and by providing a gas-absorbing getter material for subsequently maintaining the vacuum.

The temperature of the energy-receiver may be varied up to 315° C. or more by regulating the flow of heat transfer liquid through it. A greater flow causes a reduction of the temperature of the receiver for any given insolation (solar energy input) and other weather conditions.

The receiver tubing assembly is "baked-out" during evacuation at a temperature above the maximum operating temperature (e.g. 370° C. for an operating temperature of 315° C.). This is accomplished in an elongated electric furnace. The temperature stated is below the softening point of the transparent tubing. However, it is sufficiently high to out-gas all of the surfaces forming the annular volume between the receiver and the tubing. At operating temperatures below the "bake-out" temperature, no further gas is emitted by these surfaces. A baking period of several hours is satisfactory.

In addition, a getter ring 17 is placed at one or both ends of the receiver tubing assembly adjacent to the bellows, as shown in FIG. 3. Getter substance 17a is evaporated by external induction means at the end of the bake-out period. The substance immediately condenses upon adjacent surfaces in a thin deposit that often has mirror properties.

Tab 17b is welded to receiver 10 to support ring 17. The mirror aspect is not involved in the functioning of the getter or of the energy-receiver; it is consequential.

However, such a mirror surface on the inside wall of transparent tube 15 would prevent sunlight from impinging upon energy-receiver 10 and would thus slightly lower the efficiency of the device. The placement of ring 17 shown minimizes this effect, along with a "U"-shaped cross-section of the ring for holding the getter substance. The open end of the "U" is disposed toward the bellows.

Figure 4:
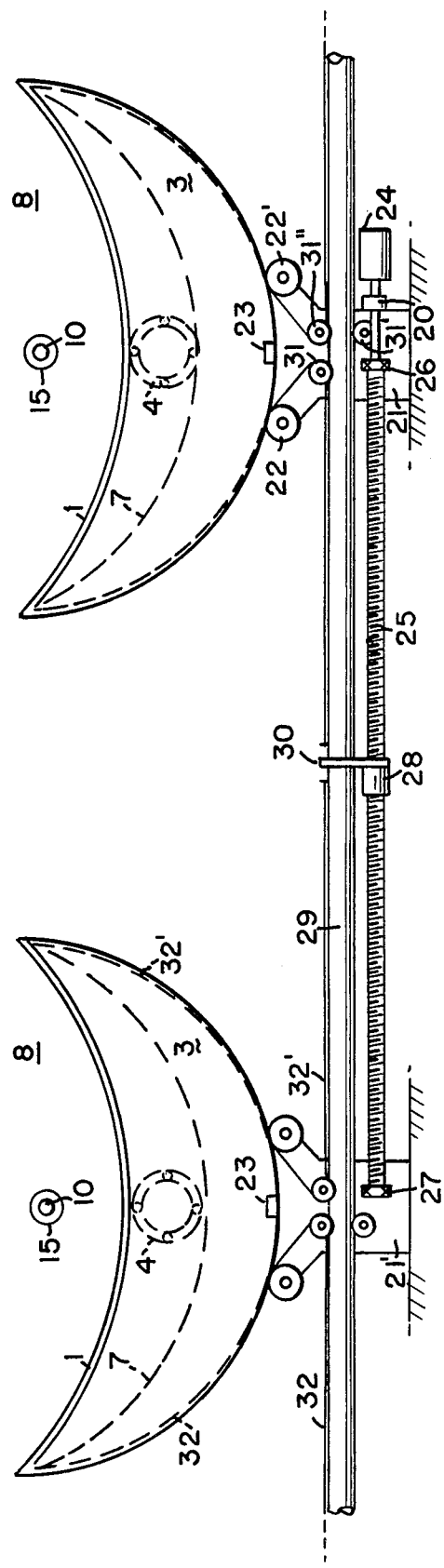
FIG. 4 is an end elevation view showing an electro-mechanical drive system for two concentrators.

In FIG. 4, numeral 21 identifies the bracket that attaches to the ground or other surface such as a roof, and which supports each sector 3 on bearings 22 and 22'. Bearing 23 and shoulders on bearings 22 and 22' support thrust loads and are required only for one sector in each row of collector assemblies shown in the system of FIGS. 5 and 5A.

The drive system as controlled by the microcomputer rotates each collector assembly or row of collector assemblies as a unit bolted together at flange 4.

The drive system consists of means to exert either an axial or a rotational force. This means is coupled to actuator shaft 29 to translate the same and thereby to rotate each collector assembly or row of collectors by cables 32 and 32'. One end of each cable is attached to an end of sector 3 and at the other end to actuator shaft 29.

One such drive system is shown in FIG. 4, and consists of stepper motor 24, which rotates ball screw 25. A torsionally resilient coupling is preferably interposed in the drive train adjacent to stepper motor 24 to reduce the stepping shock load on the motor. This is element 20.

The screw is supported by bearings 26 and 27, bearing 27 being on an adjacent bracket 21'. Rotation of the ball screw 25 causes ball nut 28 to travel axially along the ball screw and simultaneously translate actuator push-pull member (shaft or tube) between bearings 31, 31', 31" by virtue of clamp 30 between ball nut 28 and actuator element 29. Element 29 can be one piece of tubing, or a number of pieces attached one to another and extending through the rows of collector assemblies as shown in FIG. 5. At each row the cable arrangement previously described connects the actuator element to a sector for rotating the row to focus on the sun or to go to some other position as determined and controlled by the microcomputer.

Figure 4A:
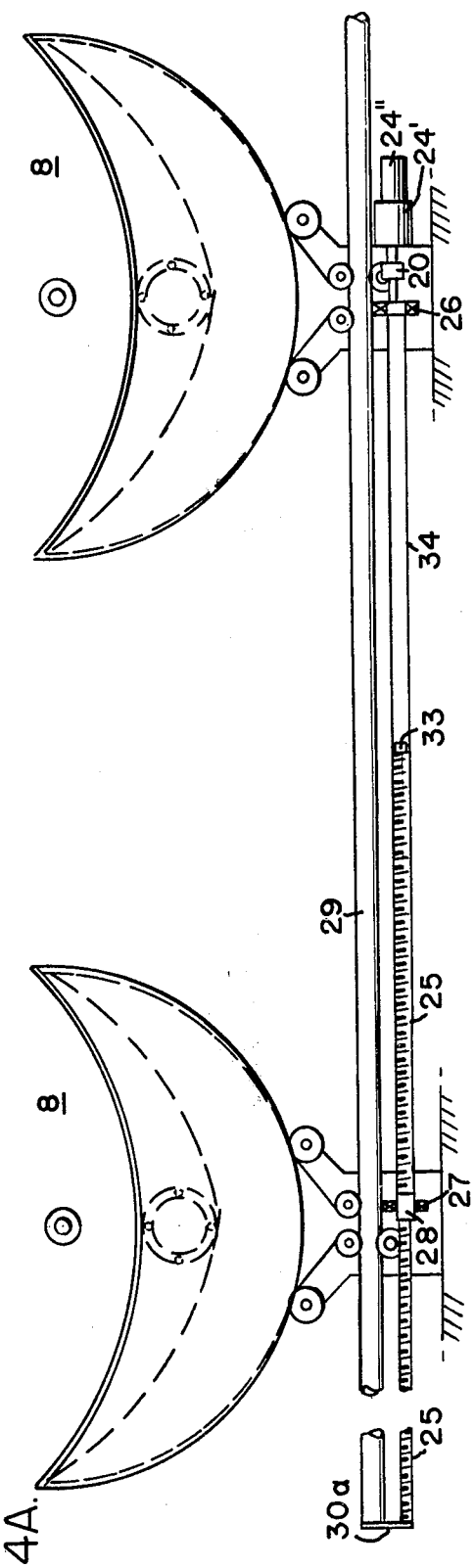
FIG. 4A is the same for an alternate electro-mechanical drive system.

The alternate drive system shown in FIG. 4A includes essentially the same elements as described in connection with FIG. 4, but differs in that the ball nut 28 is rotated by a tube 34 that is connected through coupling 20 to motor 24'. A stepper motor may be used, but motor 24' is a servo-motor that is a satisfactory alternate. Feedback for proper control originates in rotary encoder 24", which is mechanically connected to motor 24'.

Ball screw 25 is thereby translated and consequently actuator element 29 by bracket 30a, which bracket connects the ends of the ball screw and the actuator element.

In this alternate arrangement the ball screw translates from inside of the whole length of the connecting tube, which tube has the ball nut at one end and is coupled to motor 24' at the other end. Bearing 33 may be a teflon cap to facilitate the travel of the ball screw inside of tube 34. This alternate arrangement is advantageous when the angular moment of inertia of the rotatable ball screw is large with respect to the ramping time capability of motor 24'. The inertia of the rotatable connecting tube can be made relatively small by using light-weight thin-wall tubing, such as an aluminum alloy.

Figure 4B:
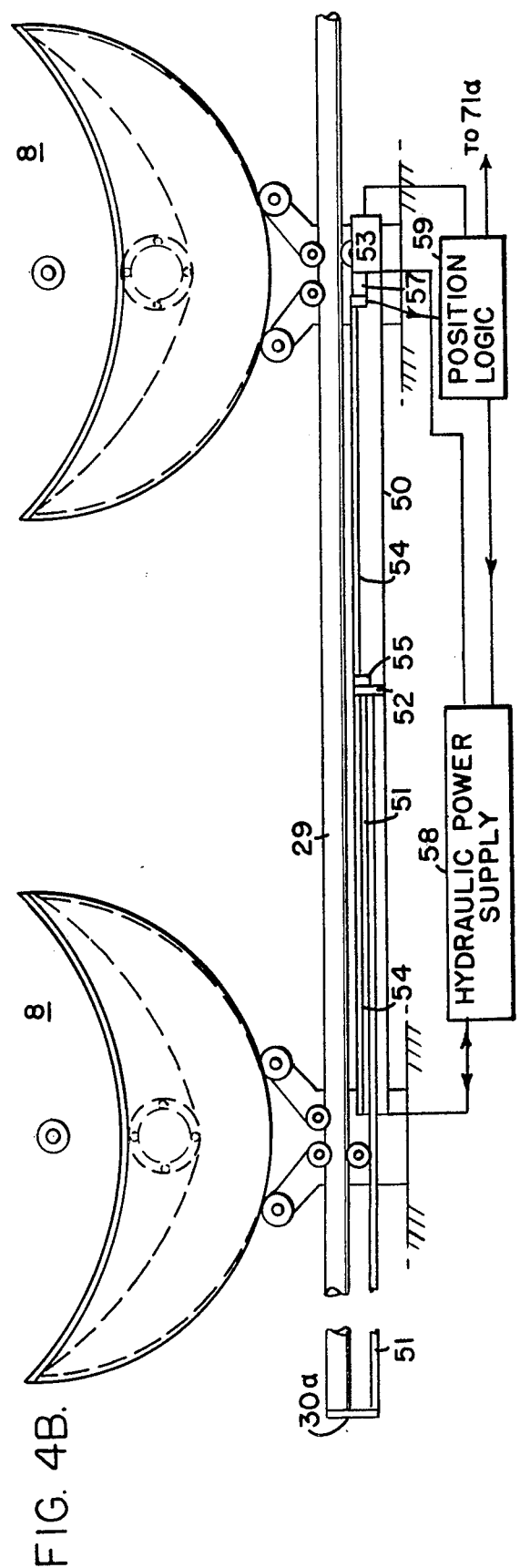
FIG. 4B is the same for an alternate hydraulic drive system.

A further alternate drive system is shown in FIG. 4B. It consists of hydraulic piston 52 and cylinder 50. Piston rod 51 is attached to and translates actuator element 29 by attachment bracket 30a.

The movement of the piston is controlled by the microcomputer through a known hydraulic power source 58 and valving for the same, with accurate feedback of the position of the actuator element 29 and piston 52 provided to the microcomputer by position logic 59. This logic may be supplied position information by optical, sonic or magnetic linear or rotary transducers.

In FIG. 4B a sonic linear displacement transducer arrangement is shown. It is available from Temposonics, Inc. Current pulses are generated by pulser 53 over a ferromagnetic wire 54 and result in sonic pulses launched at reading head 55, which is attached to piston 52. This is by magnetostrictive interaction of the magnetic field in the reading head and the current pulses in the wire. Transducer 57 detects the sonic pulses in the wire and with the associated position logic 59 accurately gives the position of piston 52 and consequently the position of actuator element 29.

The collector system of FIG. 5 includes "cross-over" tubing or pipes 60 and pump 63 circulating heat transfer fluid through pipe 61 to the collectors and through pipe 62 on the return therefrom and to thermal load 65. Three-way valve 64 facilitates bypassing the thermal load in order to reach a desired operating temperature by recirculating the heat transfer fluid through the collectors.

The control and analysis system includes a specially programmed microcomputer.

Figure 6:
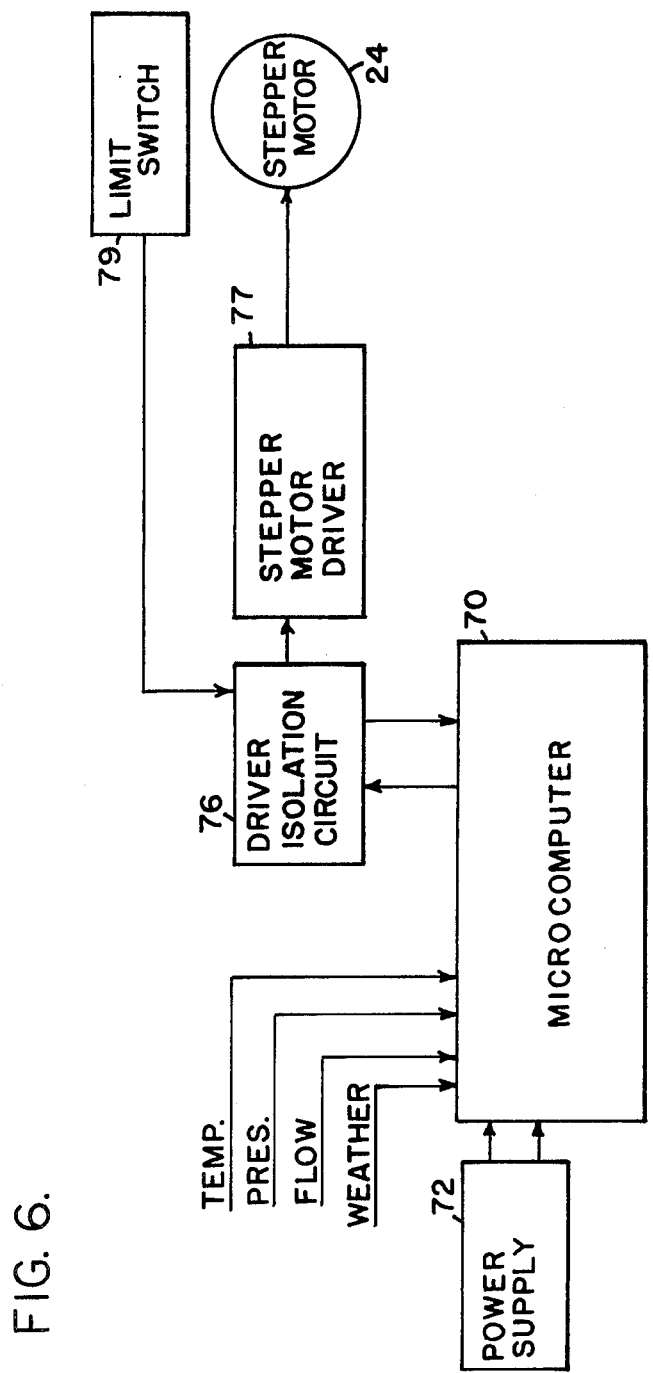
FIG. 6 is a simplified block diagram of the control and analysis microcomputer system.

FIG. 6 is a diagram of the whole control and analysis system. The implementation involves interconnection between the microcomputer element, memory, and input and output ports. The operation logic is via software commands stored in the memory elements.

The assembly also contains an input keyboard and a six digit hexadecimal display. Provision is made for interfacing an audio cassette reproducer for the purpose of loading or saving program to or from memory. A built-in memory programmer may be provided for programming an eraseable programmable read-only memory (PROM).

Figure 7:
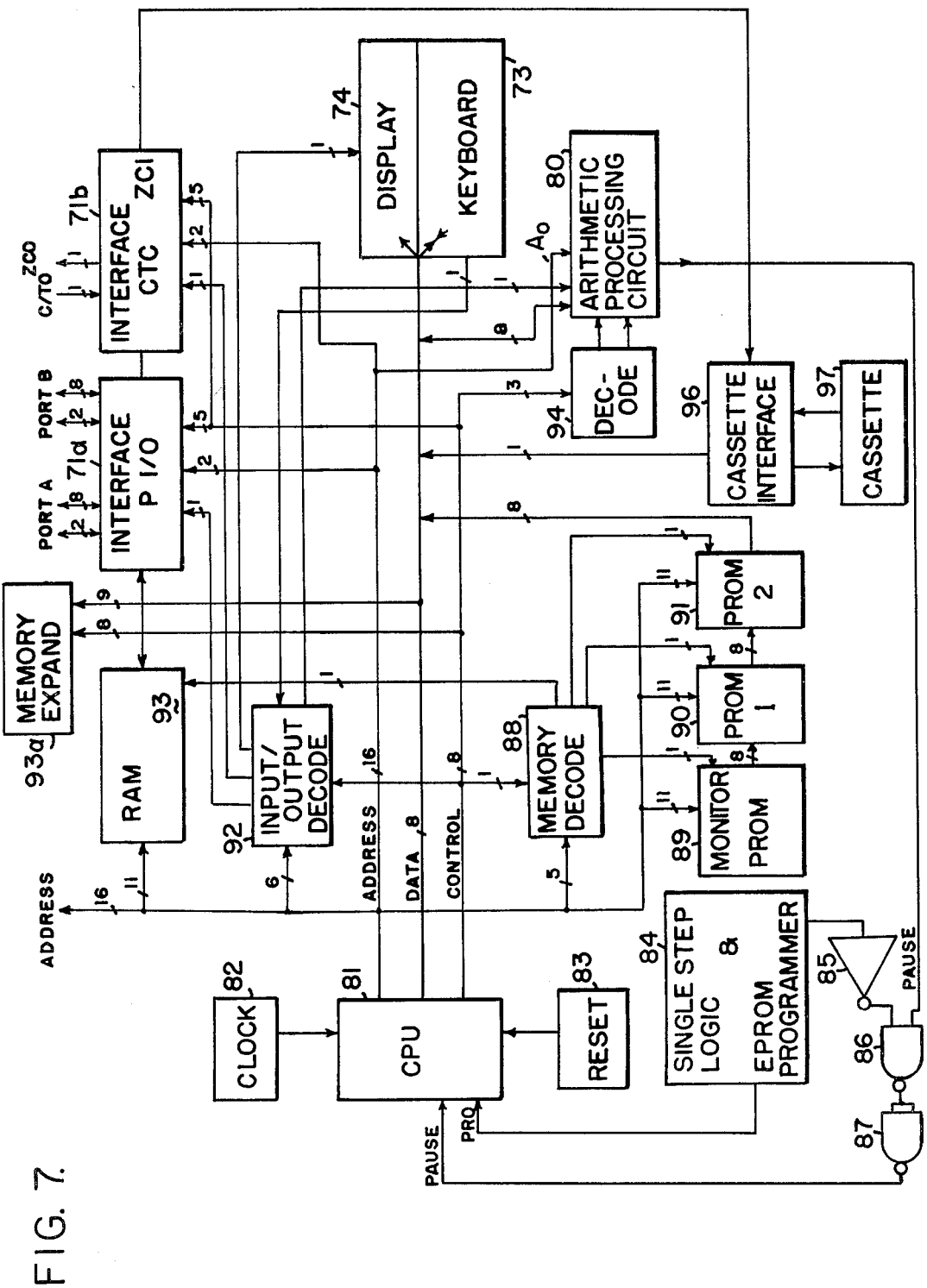
FIG. 7 is a detailed block diagram of the microcomputer.

FIG. 7 shows the block diagram of the microcomputer. The numerals adjacent to the several conductors between blocks represent the number of separate wires connected between such blocks in the detailed embodiment.

The control equations for steering the collectors and for efficiency and other calculations for performance analysis are implemented in software and accommodate structural deflections in the drive system.

The equations are solved in the microcomputer by being broken down into basic step-by-step operations; namely, algebraic, such as multiplication, trigonometric, such as to find the sine of an angle, and logical, such as the determination of the limits of travel for the collectors, or an unsafe condition in the system.

The body of the fixed program is stored in the PROM. Constants, such as the obliquity of the ecliptic, are also stored in the PROM.

The variable part of the program, such as the value of time of day, geographic coordinates, tilt and skew angles of the collectors, etc. are stored in the random access memory (RAM)

Since, if electric power were lost the data in the RAM would be lost and re-entry of the lost data would be required when power was regained, backup battery power is preferably provided to protect the collection system and also to save time in the event of a main power loss.

Typically, time is up-dated every second by a counter time circuit (CTC). Ordinarily, there will be enough time for the central processing unit (CPU) to up-date all equations once per second. The steering command to maintain the focus of the collectors on the sun will therefore be up-dated as soon as the pointing error exceeds one step at the stepping motor, or if the error exceeds a predetermined error angle at the collector.

Equations defining the rotation of the earth and subsidiary related functions at the latitude of the installation are entered as software into the microcomputer memory. Initially this is accomplished by using keyboard 73, of FIG. 7. Subsequently this may be accomplished by operating cassette 97.

Jointly, and under the control of central processing unit (CPU) 81, arithmetic processing unit 80 calculates floating decimal point trigonometric and arithmetic values, second by second, according to equations later presented herein.

After installation, upon the first start-up, or subsequently when the sun is up the time of day is entered into the CPU and the reflective concentrators are moved to concentrate sunlight upon receiver 10.

At rest, as at night, the concentrators are usually oriented by the microcomputer to one extreme side; i.e., with the optical axis horizontal. This minimizes the collection of dust, dew, and other foreign material and presents a minimum profile to hail.

In FIG. 6 the relationship of the microcomputer to significant peripherals and to concentrator control power elements and performance data inputs is shown.

Microcomputer 70 has as its principal element CPU 81 (FIG. 7). This element may be type Z80 based, manufactured by S.D. Systems of Dallas, Tex. 75228. Acceptable equivalents by other manufacturers are also available.

The essential control function, to constantly direct the reflective concentrators at the sun, is programmed into the memories of the microcomputer is a manner to be described later.

In addition, certain sensors associated with the system may be utilized to enable a calculation of the performance of the system to be made. These sensors are connected as inputs to microcomputer 70 in FIG. 6, and equivalently in more detail to element 71a in FIG. 7.

The sensor inputs typically include the temperature of the fluid in the energy-receiver, the pressure of the same, the flow rate of the fluid through the energy-receiver, and parameters of the ambient weather, including insolation.

A further input comes from power supply 72, which is used for basic synchronization. This is the known 60 hertz alternating current from the usual power mains.

Should a source of emergency power be included in the apparatus crystal-controlled means are a part thereof to accurately control the frequency.

Keyboard 73 enables an operator to enter data into the microcomputer under the control of CPU 81.

Display unit 74 enables the operator to see what data he is handling. It may be a six digit hexadecimal display and it receives an output from the CPU.

Second interface circuit 71b is also connected to CPU 81 and further to driver isolation circuit 76 of FIG. 6. The latter is interposed between low signal level elements, such as the CPU and its peripherals, and high power level elements that are controlled, such as stepper motor 24 or its equivalent and the driver for the same.

Circuit 76 may be an opto-coupler, having light optics to convey the CPU signals to the power elements, or line driver amplifiers devoid of a backwards path may be used. In this way the low level units are protected from interfering signals and surges originating with the power level elements.

Further in FIG. 6, stepper motor driver 77 (a step translator and power supply) accepts drive pulses that originate in the CPU and raises them to the required power level to actuate stepper motor 24. This driver may be a Slo-Syn Translator, manufactured by the Superior Electric Co. The motor may be a two-phase bifilar wound type, such as a Slo-Syn d.c. stepping motor having appropriate torque capability; i.e., 6.9 centimeter-kilograms (cmkg) with counterweights on the collectors, or 110.6 cmkg without counterweights, for an array of 48 collectors, each 0.9 m by 2.5 m.

Limit switch 79 is another input to isolation circuit 76. This switch has contacts arranged to close at the extremes of travel of reflective trough-like concentrators 8.

Further in FIG. 7, arithmetic processing circuit 80 is connected to CPU 81 for twoway communication. This circuit is needed to expand the mathematic capabilities of the microcomputer as a whole so that necessary orienting data for the reflective concentrators can be timely supplied.

Circuit 80 may be the type 9511, manufactured by Advanced Micro Devices, Inc., Sunnyvale CA. 94086.

In FIG. 7, clock 82 is connected to CPU 81 and cycles the same. The clock typically produces a square wave, i.e., a 50% duty cycle, at a frequency of slightly less than 2 megahertz.

Reset element 83 is essentially a switch. It is connected to CPU 81 to set the counters thereof to zero. The reset is used in accomplishing the initial operation of the microcomputer, and at any subsequent time after a "catastrophic failure" of the microcomputer.

CPU unit 81 has four different types of connections. The number of separate conductors (wires) in each group is given in FIG. 7 by a numeral adjacent to the designation of the type.

There are 16 address conductors. These are interconnected throughout the whole microcomputer. These originate from a 16 bit counter in the CPU, which counter can be manipulated by the CPU to access memories or interface devices.

There are 8 data conductors, giving eight digital bits. These conductors are connected to allow data to originate in the CPU, in memories, or in any of the interface elements. Such elements include an input-output unit, a counter, the keyboard, or other. The data conductors are bidirectional; that is, data may enter the CPU unit, or can be originated in it.

There are 8 control conductors. With these conductors the inherent structure of the CPU unit is such that a decision can be made as to whether data are entering or leaving the CPU, and which part thereof is being supplied with data or which part is supplying data.

It has been mentioned that arithmetic processing circuit 80 acts to timely supply computations. While such computations are occurring it is necessary that the CPU unit refrain from any such activity. Accordingly, a "pause" input is supplied from unit 80 to the CPU on the conductor so identified in FIG. 7.

A further connection, "PRO", to the CPU unit of the fourth type is the input from built-in memory programmer 84. This programmer programs the eraseable programmable read-only memory (PROM), when required.

An output from programmer 84 passes through inverting amplifier 85 and into one input of NAND gate 86. The other input to gate 86 is the "pause" output from processing unit 80.

When either of these inputs are "0" at the gate, the output of the same is a "1". This signal is inverted in gate 87 and goes "low" to cause CPU 81 to enter the "pause" state until the computation is complete. When it is complete the "pause" condition is removed and CPU 81 resumes control.

The "pause" condition from programmer 84 is entered only during memory programming. It is not involved during normal steering of the concentrators 8.

The duration of the "pause" interval is a few milliseconds or less.

Memory decode 88 is used to split the memory into groups. It is connected to control and address conductors from CPU 81 for correlative functioning and to memories for exercising its control. Typically, the memory groups are 2,048 bytes long. The grouping is for convenience only and results according to the particular memory elements that are used. A different memory would advantageously use a different size of grouping, such as 4,096, 8,192, etc. Each byte consists of 8 bits of data.

Memory decode 88 is internally comprised of a medium scale integrated circuit, such as the SN74LS138, having address inputs from element 80 and producing outputs of memory bank grouping signals.

Monitor (PROM) 89 is a programmable read only memory, into which software is introduced during the original set-up.

It has one input conductor for control from memory decode 88, 11 conductors for address that are connected to CPU 81, and 8 conductors for data.

Monitor 89 activates keyboard 73 and display 74 by the connections shown. That is, by energizing apparatus associated with the keyboard, so that when a key is pressed a logical action occurs; similarly as to the display.

Elements 90 and 91 are also PROMs, being identified as PROM1 and PROM 2. These are connected serially to PROM 89 and have corresponding one input conductor each from memory decode 88, 11 conductors each for address that are connected to CPU 81, and 8 data lines. These additional elements are employed to give sufficient PROM memory capacity for the control of the concentrators of this invention.

When the program has been fully entered it resides in PROM1 and PROM2.

Input/Output decode 92 is connected through 6 address conductors to CPU 81 to receive address information therefrom. A control conductor is also entered into decode 92, as is a conductor from keyboard 73. Conductors connect from decode 92 to display 74 and also to output elements to be later described.

The function of decode 92 is to input data into CPU 81, or to output data therefrom in accordance with the resident program and instructions from keyboard 73 and the addresses involved.

Internally, decode 92 is comprised of a medium scale integrated circuit, such as is used for memory block decode. It may be a type SN74LS138, manufactured by Texas Instruments, Inc.

Random address memory (RAM) 93 is used to contain the program data after the initial set-up of the microcomputer as a whole has been accomplished. Typically, it is of 1k capacity, and may be the M2114 type, manufactured by Intel Corp. Memory expand 93a may optionally expand the capacity.

It is connected to CPU 81 by 11 address conductors and to memory decode 88 by a single conductor for suitable control.

A connection of 8 control conductors is made between CPU 81 and input-output entity 71a. The latter is comprised of a commercially available special purpose circuit suitable for interfacing data to microprocessors. This particular part is manufactured by the Zlog Co., and is type 80-P IO (programmable input output).

Entity 71a also receives inputs from decode 92 via one conductor, from the address output of CPU 81 via two conductors, and from the control output of CPU 81 via 5 conductors.

Port A of entity 71a provides an input-output connection of two conductors and another of 8 conductors. These connections go to the stepper motor driver (or equivalent) 77, to limit switches 79, to weather and performance sensors, and to other parameter sensors as may be required. See FIG. 6.

Entity 71b includes a counter-timer circuit. It has one connection from decode 92. It also has connections from CPU 81 via 2 conductors with respect to address, and via 5 conductors with respect to control.

A time-interrupt input enters the C/TO terminal of entity 71b via one conductor. This input originates at power supply 72 and provides the 60 hertz signal for use in timekeeping.

A ZCO output from counter-timer 71b leaves via one conductor to accomplish the interrupt function in CPU 81. This interrupt causes recomputation of the tracking equations and so an incremental change in the orientation of concentrators 8.

Arithmetic processing circuit 80 has been previously mentioned. It receives an input from decode 92, via one conductor, informing that circuit 80 will be next involved in receiving or transmitting data, receiving a command, or supplying the status of circuit 80.

Circuit 80 receives and sends data via 8 conductors to CPU 81, on the data "bus" of the apparatus. An additional single conductor, line $A_o$, input comes from the address bus and determins whether a command or a status event will take place.

Circuit 80 provides a significant output, separately noted as "pause", that enters NAND gate 86, as has been previously mentioned. This output lasts a few milliseconds or less and causes any processing in CPU 81 and closely associated coacting elements to be suspended until the output resulting from processing in the arithmetic processing circuit 80 is delivered as required to the microcomputer system.

Decode 94 is required to properly address information entering circuit 80. Decode 94 receives control information from CPU 81 via 3 conductors. It passes on this information, as to addresses, to arithmetic circuit 80 via 2 conductors.

Decode 94 may be a type 74LS139, manufactured by Texas Instruments, Inc.

Single step logic 84 is available for "trouble-shooting". It allows one skilled in software engineering to step through the program one step at a time, thus verifying that the program is operating properly. Element 84 also allows deletions, additions or changes in the program. It is not used during normal sun tracking.

Cassette interface 96 is a peripheral that is useful in preverving the program that was initially entered in the memory of the apparatus.

The program is initially entered by manually utilizing keyboard 73. While this is being performed the program can likewise be entered into cassette 97, through cassette interface 96. Should the program be subsequently impaired or destroyed within the apparatus for any reason, it can be re-entered by merely playing the cassette.

The cassette need only have audio frequency capability. The interface converts the parallel 8 bit form of the microcomputer to the serial form for recording upon the track of the computer-data cassette. In reproducing the program from the cassette the interface 96 reconverts the data to parallel 8 bit.

Cassette interface 96 receives a ZC1 output from interface circuit CTC 71b. The latter accepts a local oscillator signal from clock 82.

Upon command residing in PROMs 90, 91, interface 96 is capable of sending or receiving data or commands.

Cassette 97 interacts with interface 96 by means of a pair of conductors in FIG. 7, which signify a recording and a reproducing capability. Cassette interface 96 provides an output to the "data" bus entering CPU 81.

Equations which follow are programmed into microcomputer 70 to;
(1) essentially continuously calculate the rotation angle that is required to aim the concentrators at the sun, and
(2) essentially continuously calculate the angle of incidence of the sun relative to the concentrators for determining the collection efficiency of the system.

Inputs required are; year, day, hour, minute, second, zone, daylite saving time, latitude, longitude, tilt and skew.

These inputs are identified by abbreviations in the considerations that follow and so are defined in detail as follows.

ROT = Rotation angle of concentrators 8 to the direction to the sun. The angle is positive when the rotation is clockwise from the horizontal as viewed from south in a north-south oriented array, or as viewed from west in an east-west oriented array.

INCIDENT = When the concentrators are correctly aimed at the sun the center of the solar disc is included in the plane of symmetry of the individual concentrator. The angle between a line from the sun to receiver 10 and a line normal to the receiver in the plane of symmetry is the incident angle. The angle is positive when the sun is south of the normal in a north-south array, or west in an east-west array.

YR = Year, A.D., as 1980, for example.

Day = Day of the year; January first is day 1, February first is day 32, etc.

HR = Hour of the day; starts at 12:00 midnight, noon is 12 hr.

MIN = Minutes from even hour; 0 to 59.

SEC = Seconds from even minutes; 0 to 59.

Zone = Time zone of the installation; Los Angeles California is in zone 8.

DASVTM = Daylight saving parameter. If daylight saving time is in effect, DASVTM = 1, if not in effect DASVTM = 0.

LAT = Latitude of the installation in degrees, preferably to two decimal places.

LONG = Longitude of the installation in degrees, preferably to two decimal places.

TILT = Degrees from the horizontal of the concentrator axis, preferably to two decimal places.

SKEW = Orientation of the concentrator axis in degrees from true north, preferably to two decimal places.

* = multiplication sign.

DELYR = YR − 1980. This quantity is evaluated to determine the number of years from the base year of 1980.

LEAP = DELYR/4, round out this value to an integer. The purpose is to determine the number of days added by leap years in the time calculation.

T = HR + (MIN + SEC/60)/60 + ZONE − DASVTM.

The purpose is to change the time to hours, including any decimal fraction thereof.

TIME = DELYR*365 + LEAP + DAY − 1 + T/24

The purpose is to change the time to days, including any decimal fraction thereof.

There are certain time corrections:
1. If DELYR = LEAP*4, TIME = TIME − 1

2. If DELYR ≠ LEAP*4 & DELYR < 0, TIME = TIME − 1

THETA = 2π*TIME/365.25

This is the solar longitude. A circular orbit is assumed.

G = −0.031271 − 4.53963*10$^{-7}$*TIME*THETA

This is the mean anomaly of the earth orbit.

In order to determine the longitude of the sun:

E$_L$ = 4.900968 − 3.69474*10$^{-7}$*TIME = (0.033434 − 2.3*10$^{-9}$*TIME)*SIN(G) + 0.000349*SIN(2G) + THETA

EPS = 0.40914 − 6.2149 10$^{-9}$*TIME

This is the angle between the plane of the ecliptic and the plane of the celestial equator.

DECL = SIN$^{-1}$[SIN(E$_L$)*SIN(EPS)]

This is the declination, the angle between traces of the plane of the celestial equator and the plane of the ecliptic on the plane of the hour circle of the sun.

RA = TAN$^{-1}$[COS(EPS)*SIN(E$_L$)/COS(E$_L$)]

This is the right ascension, the angle between the planes of the hour circle of vernal equinox and the hour circle of the sun.

ST = 1.759335 + 2*π)TIME/365.25 − DELYR) + 3.694*10$^{-7}$*TIME

This is the sidereal time at Greenwich.

S = ST + (T*15 − LONG)*2π/360

This is local sidereal time.

E = SIN$^{-1}$[SIN(LAT)*SIN(DECL) + COS(LAT)*COS(DECL)*COS(RA − S)]

This is elevation, the angle of the sun above the horizontal.

A = SIN$^{-1}$[COS(DECL)*SIN(RA − S)/COS(E)]

This is azimuth, the angle of the sun in the horizontal plane from true south; positive is east.

DELELS = [58.1/TAN(E) − 0.07/(TAN(E))$^3$ + 0.000086/(TAN(E))$^5$]*1/3600

This is the refraction correction of the sun rays passing through the atmosphere. Standard conditions are assumed.

PCOR = PRESSURE IN MILLIBARS/1013

This converts the refraction correction to a given air pressure.

TCOR = AVE. AMBIENT TEMP DURING COLLECTION HOURS (273+°C.)/284

This converts the refraction correction to a given air temperature.

DELEL = DELELS*PCOR*TCOR

This is the refraction correction for a given value of elevation.

$E_a$ = DELEL + E

This is the actual elevation of the solar image at the collector.

SI = −SIN(TILT)*SINE(SKEW)*COS($E_a$)*SIN(A) + SIN(TILT)*COS(SKEW)*COS($E_a$)*COS(A) + COS(TILT)*SIN($E_a$)

This is a parameter for the calculation of the ROT and the INCIDENT angles; see below.

SJ = −COS(SKEW)*COS($E_a$)*SIN(A) − SIN(SKEW)*COS($E_a$)*COS(A)

This is also a parameter for the calculation of the ROT and the INCIDENT angles; see below.

ROT = −TAN$^{-1}$(SJ/SI)

This is used to maintain the focus of the sun upon the collectors 10.

INCIDENT = COS$^{-1}$((SI)$^2$+(SJ)$^2$)$^{\frac{1}{2}}$

This is pertinent to determining the efficiency of solar energy collection.

We claim:
1. A solar energy collector system, comprising;
 (a) a transmissive-reflective trough-like quasi-parabolic integrally rigid concentrator (8) having a linear focus,
 (b) an elongated tubular support (2) having a sector (3) centrally supporting said concentrator, said tubular support attached to but optically removed from said concentrator,
 (c) a geometrically fixed at one end highly-elongated stationary linear energy-receiver essentially wholly disposed at said linear focus, and having a hydraulic use circuit (61,62),
 (d) elongated means-to-rotate (29,25) said concentrator about said energy-receiver, disposed at right-angles to said concentrator,
 (e) a prime mover (24,24' or 52),
 (f) means-to-couple (30,32) said prime mover to said sector (3) for the rotation of said concentrator, and
 (g) microcomputer means (70) for control of said prime mover, including means, structured and programmed for fixed and variable parameters of spherical geometry relative to the rotation of the earth, for calculating the position of the sun and accounting for atmospheric refraction, and structural deflections, according to the program equation ROT = −TAN$^{-1}$(SJ/SI) to exclusively control said prime mover and to maintain an image of the sun essentially wholly upon said energy-receiver by essentially continuous recomputation.

2. The solar energy collector system of claim 1, in which said concentrator (8) is;
 (a) quasi-parabolic in cross-section,
 (b) the concentrator is formed of a transparent substance of uniform thickness,
 (c) the reflective surface (1) of the concentrator is on the surface of the concentator that is away from said energy-receiver, and
 (d) the quasi-parabolic cross-section departs from an equivalent true parabola to correct for refraction of light that has passed through said transparent substance at less than 90° angle of incidence.

3. The solar energy collector system of claim 2, in which the reflecting surface of said quasi-parabolic cross-section is described by the cubic equation:

$Y = AX^3 + BX^2 + CX + D$ where the constants for a 90 cm wide aperture and 0.3 cm thickness of glass are:

A + 170.6553 × 10$^{-9}$

B = 17.12772 × 10$^{-3}$

C = −60.99 × 10$^{-5}$

D = −73.914 × 10$^{-3}$ and X and Y are in centimeters.

4. The collector system of claim 1, in which said support (2) additionally includes;
 (a) plural ribs (7,7',7'') rigidly attached to and extending from said elongated tubular support, and
 (b) a resilient bonding substance (9) between said plural ribs and said concentrator.

5. The collector system of claim 1, which additionally includes;
 (a) a transparent tube (15) having a length to diameter ratio in excess of approximately one-hundred to one surrounding said linear energy receiver,
 (b) hermetic seals at each end of said tube (11,14) between said tube and said energy-receiver in the form of longitudinally expansive bellows (12), attached to said transparent tube at one end of said bellows and to said energy-receiver at the other end of said bellows, and
 (c) a vacuum established in the annular volume between said tube and said energy-receiver.

6. The solar energy collector system of claim 1, in which said prime mover includes;
 (a) a stepper-motor (24) in an error-corrected open-loop circuit from said microcomputer means (70).

7. The solar energy collector system of claim 1, in which said prime mover includes;
 (a) a servo-motor (24'), and
 (b) an electro-mechanical position feedback sensor (24'') in a closed-loop circuit including said microcomputer means (70).

8. The solar energy collector system of claim 1, in which said prime mover includes;
 (a) a linear actuator (51), and
 (b) an actuater position feedback sensor (57).

9. The solar energy collector system of claim 1, in which said means-to-couple includes;
  (a) a translating actuator (25 or 51) connected to said prime mover (24, 24' or 52),
  (b) a push-pull member (29) connected to said translating actuator, and
  (c) at least one pair of flexible cable-like elements (32, 32') connected to said push-pull member for translation thereby and also connected to at least one said sector (3) for rotating said concentrator (8).

10. The solar energy collector system of claim 1, in which said means-to-couple includes;
  (a) ball-screw means (25) connected to said prime mover (24 or 24'),
  (b) ball-nut means (28) translatable along said ball-screw means, and
  (c) a pair of flexible cables (32, 32') of predictable deformation connected to said ball-nut means for translation thereby,
  said cables also connected to said sector (3) for rotating said concentrator (8).

11. The solar energy collector system of claim 1, in which said means-to-couple includes;
  (a) ball-nut means (28) connected to said prime mover (24 or 24'),
  (b) ball-screw means (25) translatable through said ball-nut means, and
  (c) a pair of flexible cables (32, 32') of predictable deformation connected to said ball-screw means for translation thereby,
  said cables also connected to said sector (3) for rotating said concentrator (8).

12. The solar energy collector system of claim 1, in which said prime mover (52) includes;
  (a) an elongated hydraulic actuator (50,52), and
  (b) an elongated piston rod (51), connected to said means-to-couple.

13. The solar energy collector system of claim 1, in which said microcomputer means includes;
  (a) a memory (93) containing geographic location and skew and tilt orientation data of said collector system, and
  (b) memory-resident (93) software including corrections for atmospheric refraction and mechanical deflections for exclusively maintaining an image of the sun upon said energy-receiver (10).

14. The solar energy collector system of claim 1, in which said microcomputer means includes;
  (a) memory-resident (89,90,91) software for calculating and displaying at least operator-selected thermal efficiency, including unsafe operation.

15. The solar energy collector system of claim 1, in which said microcomputer means includes;
  (a) memory-resident (89,90,91) software for calculating the proper position of said concentrator (8) upon periodic time demand, and
  (b) for returning said concentrator to a non-functioning position upon a determination of unsafe thermal conditions.

16. The solar energy collector system of claim 1, in which said microcomputer means includes;
  (a) a central processing unit (CPU 81),
  (b) a clock (82), connected to said central processing unit to actuate the same,
  (c) an input/output data interface (71), having a counter-timer circuit, and a driver isolation circuit (76), said interface connected to said central processing unit,
  (d) an arithmetic-processor circuit (80), connected to said central processing unit, to timely supply concentrator orientation data,
  (e) a read only memory (89,90,91), connected to said central processing unit,
  (f) a random access memory (93), connected to said central processing unit and also to said input/output data interface,
  (g) an input keyboard (73), connected to said central processing unit,
  (h) an output display (74), connected to said central processing unit, and
  (i) a pause circuit (85,86,87) connected to said central processing unit to enable calculation of at least thermal efficiency without interrupting timely concentrator orientation data.

17. The solar energy collector system of claim 16, which additionally includes;
  (a) a tape cassette reproducer (97), having a cassette containing software, latitude, longitude, skew, tilt, atmospheric refraction, and structural deflection information, and
  (b) a cassette interface (96), connected to said cassette reproducer and to said central processing unit to enter said information into said central processing unit.

18. The solar energy collector system of claim 16, which additionally includes;
  (a) a tape cassette recorder (97), having a cassette, said recorder and said cassette suited for accepting software, latitude, longitude, skew, tilt, atmospheric refraction, and structural deflection information, and
  (b) said cassette interface (96), having recording capability to accept software, latitude, longitude, skew, tilt, atmospheric refraction, and structural deflection information from said central processing unit and pass it to said cassette recorder for recording upon said cassette.

* * * * *